US008543671B1

(12) United States Patent
Orey et al.

(10) Patent No.: US 8,543,671 B1
(45) Date of Patent: Sep. 24, 2013

(54) GROUPED COMPUTING DEVICE CONFIGURATION MANAGEMENT

(75) Inventors: Kevin Orey, San Antonio, TX (US); David Flores, San Antonio, TX (US); Derek LeBlanc, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 339 days.

(21) Appl. No.: 12/982,643

(22) Filed: Dec. 30, 2010

(51) Int. Cl.
*G06F 15/177* (2006.01)

(52) U.S. Cl.
USPC ............ 709/220; 709/203; 709/217; 709/223

(58) Field of Classification Search
USPC .................................. 709/203, 217, 220, 223
See application file for complete search history.

(56) References Cited

U.S. PATENT DOCUMENTS

| | | | |
|---|---|---|---|
| 6,928,644 B1* | 8/2005 | Kroening et al. | 717/175 |
| 7,657,533 B2* | 2/2010 | Gold et al. | 707/999.01 |
| 7,974,211 B2* | 7/2011 | Suriyanarayanan | 370/252 |
| 8,065,397 B2* | 11/2011 | Taylor et al. | 709/220 |
| 8,140,899 B2* | 3/2012 | Ren et al. | 714/26 |
| 2003/0212775 A1 | 11/2003 | Steele et al. | |
| 2003/0233385 A1* | 12/2003 | Srinivasa et al. | 709/1 |
| 2005/0097517 A1* | 5/2005 | Goin et al. | 717/124 |
| 2005/0154733 A1* | 7/2005 | Meltzer et al. | 707/10 |
| 2005/0188117 A1 | 8/2005 | Brown et al. | |
| 2005/0198235 A1 | 9/2005 | Kumar et al. | |
| 2008/0021883 A1 | 1/2008 | Alstrin et al. | |
| 2010/0058157 A1* | 3/2010 | Kelly et al. | 714/819 |
| 2011/0225275 A1* | 9/2011 | Shah et al. | 709/223 |

OTHER PUBLICATIONS

"ZENworks 10 Configuration Management SP3" Novell, Retrieved on Nov. 3, 2010 from the internet <URL: http://www.novell.com/documentation/zcm10/pdfdoc/zcm10_getting_started_ent/zcm10_getting_started_ent/pdf>.

* cited by examiner

*Primary Examiner* — Phuoc Nguyen
(74) *Attorney, Agent, or Firm* — Brooks, Cameron & Huebsch, PLLC

(57) ABSTRACT

Grouped computing device configuration management systems and methods are described herein. One or more systems include a first number of computing devices having processors and memory thereon for the storage of executable instructions and data, wherein the instructions are executed to establish a computing device baseline configuration at both a command level and a file level for use in comparing the baseline configuration with a second number of computing devices, execute a first set of executable instructions on the first number of computing devices to send a second set of executable instructions to the second number of computing devices and that execute on the second number of computing devices to collect data regarding command and file level configuration of the second number of computing devices, receive, on the first number of computing devices, data collected from the second number of computing devices, compare the data collected with data from the baseline configuration to determine one or more differences, and initiate at least one action selected from the group including issuing an alert, flagging the differences in a database, generating a report listing the differences, identifying a solution to resolve the differences, and executing instructions to resolve the differences.

19 Claims, 4 Drawing Sheets

GROUPED COMPUTING DEVICE CONFIGURATION MANAGEMENT

TECHNICAL FIELD

The present disclosure relates to systems and methods for grouped computing device configuration management.

BACKGROUND

In some fields of technology, computing devices are pooled together to provide increased bandwidth for large groups of users. For example, high traffic web sites can use many computers that provide the same functionality and when one is busy another can take on user traffic to help avoid the web site being viewed as slow or having the site crash. Other examples include automated call centers and database structures, among other fields of technology that may utilize such pooling of devices. With so many devices, it may be difficult to maintain the devices so they all function in the same way.

DETAILED DESCRIPTION

Grouped computing device configuration management systems and methods are described herein. For example, one or more systems include a first number of computing devices having processors and memory thereon for the storage of executable instructions and/or data, wherein instructions are executed to establish a computing device baseline configuration at both a command level and a file level for use in comparing the baseline configuration with a second number of computing devices, execute a first set of executable instructions on the first number of computing devices to send a second set of executable instructions to the second number of computing devices and that execute on the second number of computing devices to collect data regarding command and file level configuration of the second number of computing devices, receive, on the first number of computing devices, data collected from the second number of computing devices, compare the data collected with data from the baseline configuration to determine one or more differences, and initiate at least one action selected from the group including issuing an alert, flagging the differences in a database, generating a report listing the differences, identifying a solution to resolve the differences, and executing instructions to resolve the differences. Other systems and methods are disclosed herein.

Use of the systems and methods described herein can be beneficial, for example, because they allow a group of computing devices to be maintained such that the devices function in the same way. This can be accomplished on both a command level and a file level making the devices nearly identical in function and content (e.g., excluding filtered items as will be discussed below).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of computing devices" can refer to one or more computing devices.

Figure 1:
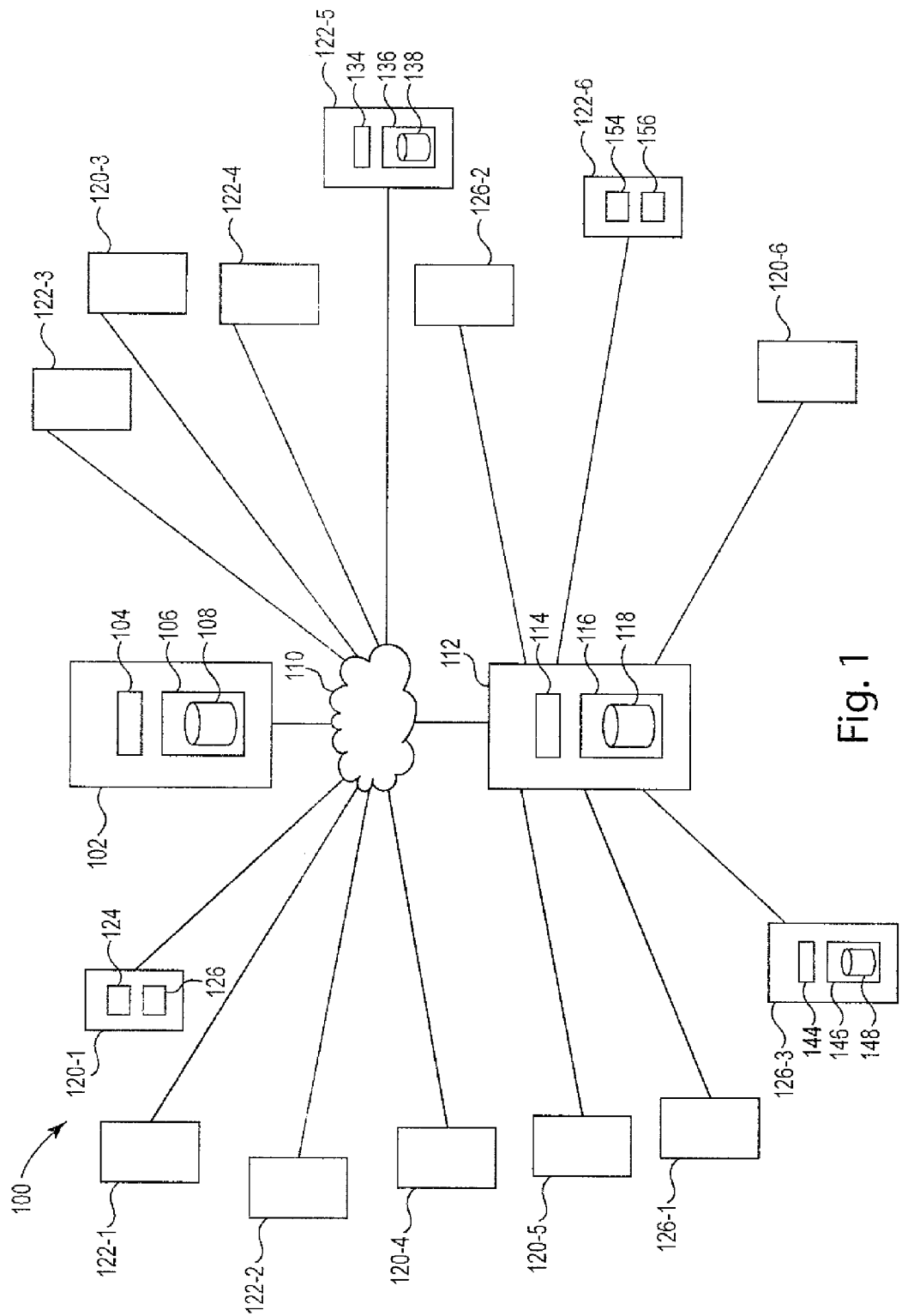
FIG. 1 illustrates a system that can be used in accordance with one or more embodiments of the present disclosure.

FIG. 1 illustrates a system that can be used in accordance with one or more embodiments of the present disclosure. In the embodiment illustrated in FIG. 1, the system 100 is provided for grouped computing device configuration management.

The system 100 includes a number of computing devices for collecting, storing, and/or analyzing data regarding the content and/or operation of the computing devices within one or more groups of computing devices. For example, the system includes a computing device 102 having one or more processors (e.g., processor 104) and memory 106. In some computing devices, the memory can contain a database 108.

In the embodiment of FIG. 1, the device 102 can include executable instructions to provide a user interface to access the grouped computing device configuration management functionality. These instructions can be, for example, stored in memory 106 and executed on processor 104.

The user interface may, for example, be a web based user interface. This can be beneficial for a number of reasons. For example, the web base can allow the interface to be accessed remotely from the rest of the system via a network (e.g., such as the Internet). The web interface also can be utilized to make the interface platform (i.e., operating system) neutral, thereby allowing a user on one software platform (e.g., Windows) able to analyze data from another platform (e.g., UNIX), in some embodiments.

In some embodiments, executable instructions can enable the user interface to be utilized to schedule the collection and/or comparison functionalities of the system. This can be beneficial for a number of reasons.

For example, the scheduling can be done such that one or both of these functions happen during time periods where the system may be less busy and therefore more able to complete these functions efficiently. The scheduling can provide a periodic executing of one or both of these functionalities and the period could be made short or long, in some embodiments, thereby allowing flexibility in the time period between execution of one or both of these functions.

The processor 104 can be utilized to execute instructions that can be stored in memory 106 or on other computing devices or storage mediums connected thereto. Memory 106 can also be utilized to store data thereon. Data can be used or analyzed through use of instructions that are executed on a processor (e.g., processor 104) of the system 100.

The computing device 102 can be connected to other computing devices of the system 100 directly (through a wired or wireless connection) or indirectly (through a network as described in more detail herein). For example, in the system 100 of FIG. 1 the computing device 102 is connected to multiple other computing devices (e.g., 112, 120-1, 122-1, 126-3, etc.) via a network 110, however, the computing devices may be connected via a wired or wireless connection directly to each other or indirectly through a network, as shown or through one or more other devices.

A computing device can be utilized as a grouped computing device configuration management engine (e.g., computing device 112). Device 112 in FIG. 1 also includes one or more processors 114, memory 116, and databases 118 therein.

The engine 112 can be used as the device for collecting, storing, and/or analyzing the data of the system 100 or portions thereof. For example, the engine 112 can receive instructions from the user via computing device 102 and collect data from other computing devices of the system. In some embodiments, the data can be stored in the database 118 and/or another database of the system (e.g., a database device connected to the computing device 112).

For instance, in the embodiment illustrated in FIG. 1, the other computing devices of the system are grouped into three groups. A first group includes computing devices 120-1, 120-2, 120-3, 120-4, 120-5, and 120-6. A second group includes 122-1, 122-2, 122-3, 122-4, 122-5, and 122-6. A third group includes 126-1, 126-2, and 126-3.

In some embodiments, the computing devices have been grouped in order to best maintain their command and file level data making the devices nearly identical in function and content. This may allow the system to interchange the computing devices without changing the functionality of the system.

This can be beneficial in systems where large numbers of computing devices handle a large number of similar and/or identical tasks (e.g., call centers, web sites, or databases). For example, a web site may receive a large number of page requests from users accessing the site. If the command and/or file level structures or contents are different, these differences may result in different information being provided to the users (e.g., prices of products on the site and/or product features). The one or more selection criteria for grouping can be any grouping criterion suitable to identify such difference.

For example, the computing devices can be grouped according to operating system and/or functionality type. For instance, suitable groups by functionality include, but are not limited to, external network interaction devices, internal network interaction devices, web site interaction devices, UNIX interaction devices, Windows interaction devices, and/or Linux interaction devices.

As shown in the embodiment of FIG. 1, some systems can have multiple sub-groupings of computing devices. In some embodiments, the multiple sub-groupings of computing devices are grouped according to a function of the computing devices. The data collected can similarly be related to the function or according to the operating system of the computing devices, among other grouping mechanisms.

The grouping of these devices can, for example, be accomplished via instructions that execute to provide a user interface to allow a user to define the multiple sub-groupings. In some embodiments, executable instructions can accomplish the grouping of the devices.

In some embodiments, a user interface, can for example, also allow a user to select data to be collected on the second number of computing devices. In some embodiments, executable instructions can make the selection, for example, based upon the grouping methodology used (e.g., certain data can be selected based upon the functionality of the computing device)

Furthermore, although not shown, the other computing devices (e.g., computing device 120-6) of the system 100 can also have one or more processors, memory, and/or databases provided thereon and can be similar to those described with respect to the one or more processors 104, memory 106, and databases 108 in computing device 102.

Memory (e.g., memory 106, 116, 126, 136, 146, and/or 156) can be volatile or nonvolatile memory. The memory can also be removable, e.g., portable memory, or non-removable, e.g., internal memory. For example, the memory can be random access memory (RAM) or read-only memory (ROM).

Memory can, for example, be dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory (e.g., memory 106) is illustrated as being located in a computing device (e.g., computing device 102), embodiments of the present disclosure are not so limited. For example, memory can also be located in a memory device that is not a computing device, but is connected to a computing device. For example, in some embodiments, the memory can be internal to another computing resource and can enable computer readable instructions to be uploaded and/or downloaded over a network, such as the Internet, or another wired or wireless connection to and/or from one or more computing devices.

Memory can store executable instructions, such as, for example, computer readable instructions (e.g., software). One or more processors (e.g., processor 104) can execute the executable instructions stored in memory.

The system can also include a number of databases (e.g., 108, 118, 138, and/or 148). Such databases are also forms of memory, and are typically used to store data, but are not limited to storing data therein.

In some embodiments, instructions and/or data can be communicated via a network 110, such as, for example, a wide area network (WAN) such as the Internet, a local area network (LAN), a personal area network (PAN), a campus area network (CAN), or metropolitan area network (MAN), among other types of networks to other devices of the system.

As used herein, a "network" can provide a communication system that directly or indirectly links two or more computers and/or peripheral devices and allows users or computing devices to access resources on other computing devices and exchange messages with other users or computing devices. A network can allow users to share resources on their own systems with other network users and to access information on centrally located systems or on systems that are located at remote locations.

A network may provide connections to the Internet and/or to the networks of other entities (e.g., organizations, institutions, etc.). Users or computing devices may interact with network-enabled software applications to make a network request, such as to get a file from other network resources. For instance, applications may also communicate with network management software, which can interact with network hardware to transmit information between devices on the network.

Figure 2:
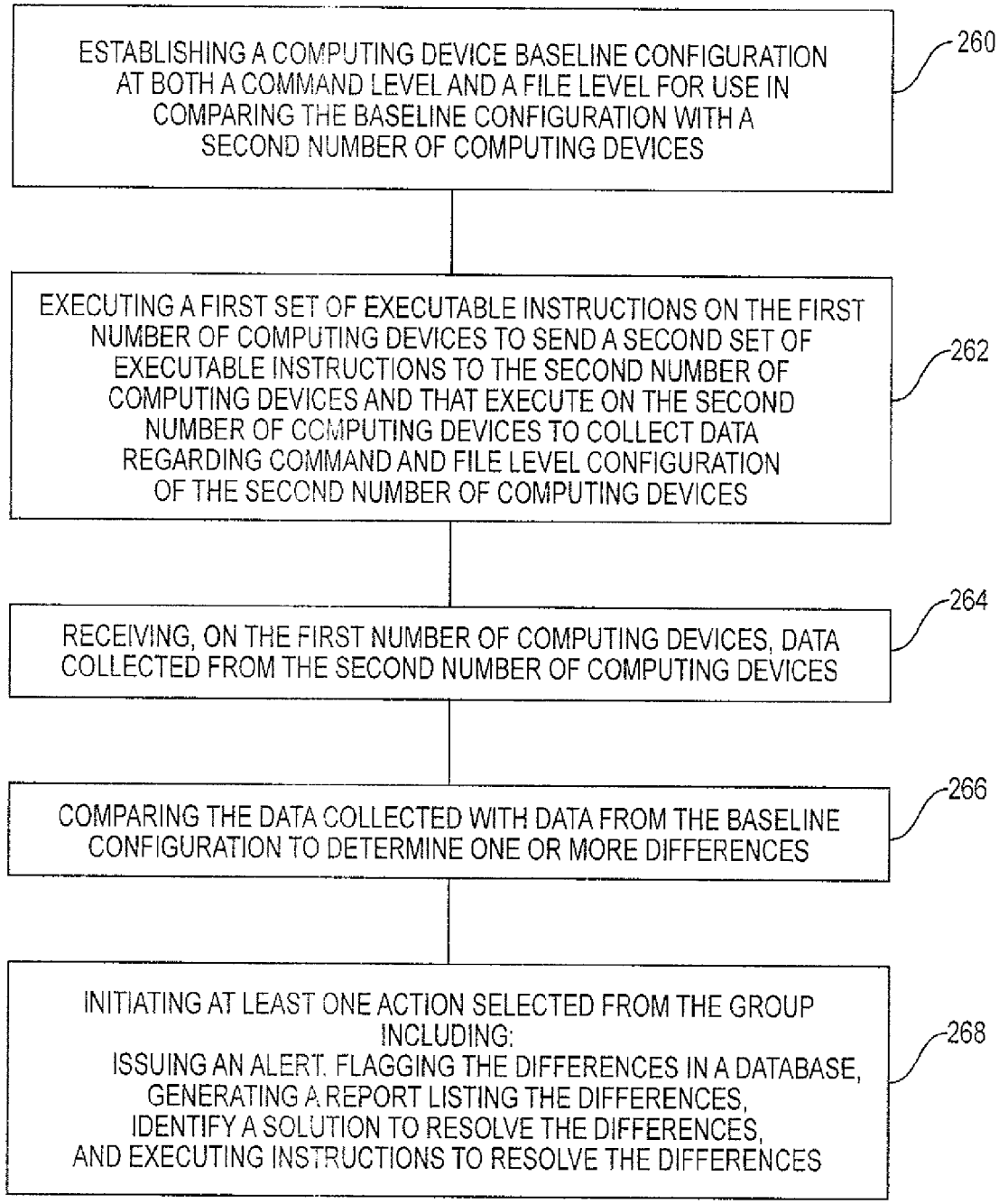
FIG. 2 illustrates a method according to one or more embodiments of the present disclosure.

FIG. 2 illustrates a method according to one or more embodiments of the present disclosure. The method can be performed by a system, such as, for example, system 100 previously described in connection with FIG. 1. For instance, the method can be accomplished by system 100 wherein computing device 102 and/or 112 are computing devices within a first number of computing devices having processors and memory thereon for the storage of executable instructions and data, wherein the instructions are executed to perform a method such as that illustrated in FIG. 2.

The method of FIG. 2 includes establishing a computing device baseline configuration at both a command level and a file level for use in comparing the baseline configuration with a second number of computing devices, at block 260. In this example, the second number of computing devices can be computing devices 120-1, 120-2, 120-3, 120-4, 120-5, and 120-6 of FIG. 1.

Selecting a baseline computing device configuration can be accomplished by input from a user such as a system administrator or can be based on a computing device in the group being maintained. For example, a computing device (e.g., device 120-3 from the number of computing devices can be selected as a baseline configuration computing device and data can be collected from the baseline configuration computing device to be used as the computing device baseline configuration data. This data can then be compared from time to time with the data from the other computing devices in the group (e.g., computing devices 120-1, 120-2, 120-4, 120-5, and/or 120-6).

In block 262, the method includes executing a first set of executable instructions on the first number of computing devices to send a second set of executable instructions to the second number of computing devices and wherein the second set of executable instructions execute on the second number of computing devices to collect data regarding command and file level configuration of the second number of computing devices. Such instructions allow information to be gathered for analysis of the state of the particular computing device on which the data was gathered.

This can be compared to the base line configuration and, in some embodiments, to other computing devices in the computing device's group (e.g., data from computing device 120-1 can be compared with data from computing device 120-2). Additionally, in some embodiments, data from a particular computing device can be compared with historical data from that particular device, historical base configuration data, historical data from other devices in the group, and/or historical data regarding the group. This data can, for example, be stored in memory 116 and/or in database 118.

Such information can be beneficial, for instance, because it can provide some perspective as to how the system and/or group has changed over time, whether a particular configuration was better or worse than a previous configuration, and/or how to return the computing device to that previous configuration, if desirable.

The data from the computing device can be collected and sent to the grouped computing device configuration management engine (e.g., computing device 112). For example, the method of FIG. 2 includes receiving, on the first number of computing devices, data collected from the second number of computing devices, at block 264.

Block 266 of the method embodiment of FIG. 2 includes comparing the data collected with data from the baseline configuration to determine one or more differences. This can be accomplished, for example, through execution of executable instructions stored in memory on the system and executed by a processor, such as processor 114 of FIG. 1.

At block 268 in FIG. 2, the method includes initiating at least one action selected from the group including issuing an alert, flagging the differences in a database, generating a report listing the differences, identifying a solution to resolve the differences, and executing instructions to resolve the differences. For example, in some embodiments, issuing an alert includes notifying a user via a user interface on one of the first number of computing devices that data on one of the number of second computing devices has been added, changed, or deleted.

In some embodiments, the system includes instructions executed to apply one or more filters to the data collected wherein the one or more filters ignore one or more differences between the data collected and the data of the baseline configuration. The filters can exclude data from consideration during comparison.

This may be beneficial, for example, where the content of the data does not necessarily need to be identical, but where the command structure or file structure needs to be the same. For example, a computing device may save data collected from users of a web site, such as data entered by the user during a purchase of a product. Since each computing device in this group will likely be interacting with different users and their data will likely be different, the content data can be ignored, but the structure of the data files can be compared by the system as the purchase functionality of the web site should be the same from one computing device to the next.

Figure 3:
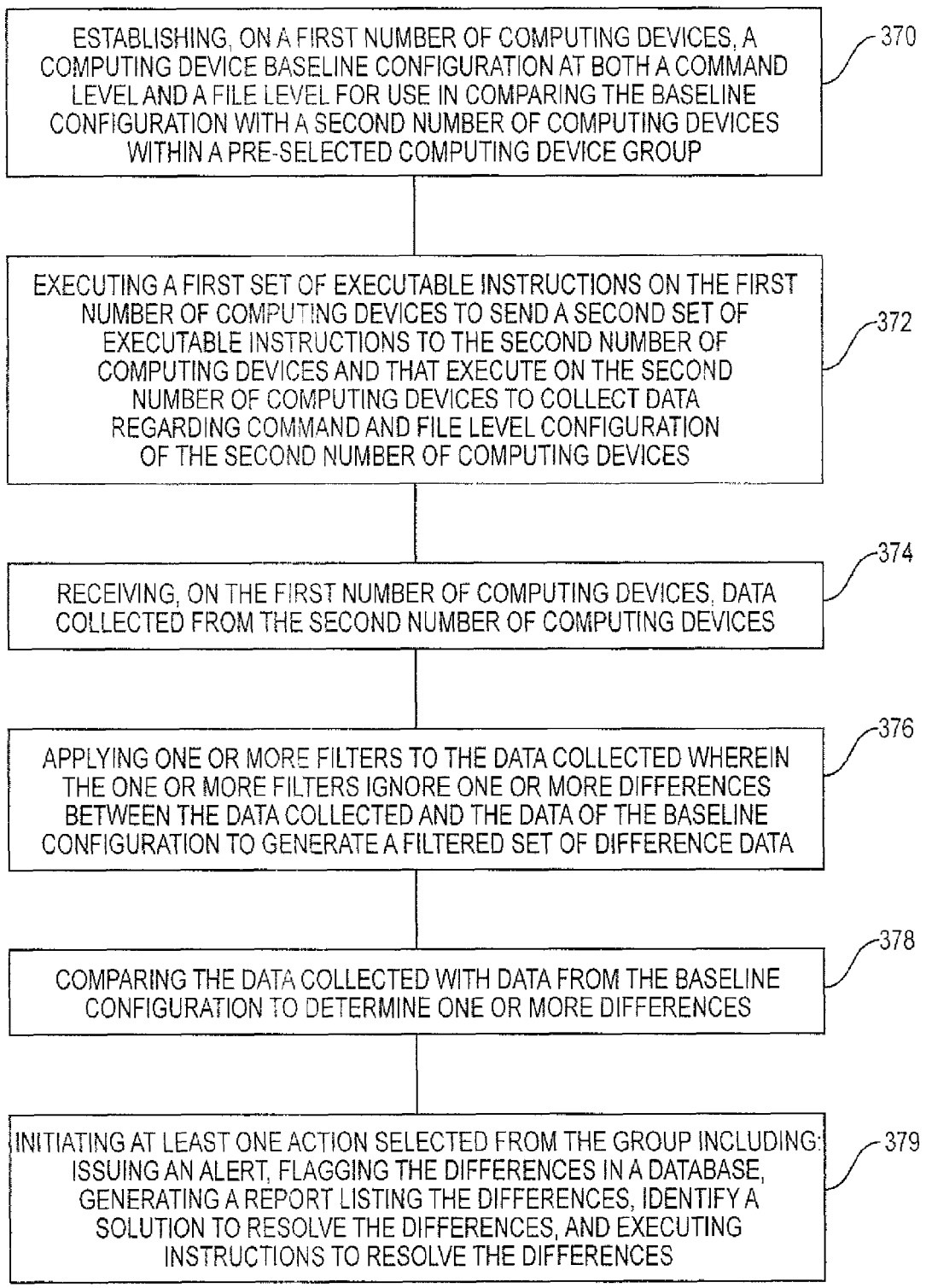
FIG. 3 illustrates another method according to one or more embodiments of the present disclosure.

FIG. 3 illustrates another method according to one or more embodiments of the present disclosure. As with the method of FIG. 2, this method can be performed by a system, such as, for example, system 100 previously described in connection with FIG. 1.

The embodiment of FIG. 3 includes establishing, on a first number of computing devices, a computing device baseline configuration at both a command level and a file level for use in comparing the baseline configuration with a second number of computing devices within a pre-selected computing device group, at block 370.

At block 372, the method includes executing a first set of executable instructions on the first number of computing devices to send a second set of executable instructions to the second number of computing devices and that execute on the second number of computing devices to collect data regarding command and file level configuration of the second number of computing devices. The method of FIG. 3 also includes receiving, on the first number of computing devices, data collected from the second number of computing devices, at block 374.

Block 376 of the method embodiment of FIG. 3 includes applying one or more filters to the data collected wherein the one or more filters ignore one or more differences between the data collected and the data of the baseline configuration to generate a filtered set of difference data. In various embodiments, applying one or more filters to the data collected includes selecting one or more files from the data collected to be discarded prior to comparing the data collected with data from the baseline configuration to determine one or more differences.

In some embodiments, applying one or more filters to the data collected includes selecting one or more pieces of data collected within a file and ignoring (e.g., discarding or excluding) the selected pieces of data prior to comparing the data collected with data from the baseline configuration to determine one or more differences. In some embodiments, methods can include executing instructions to provide a user interface to allow a user to define one or more filter criteria that will be used by or to select the executable instructions to apply the one or more filters.

The method of FIG. 3 also includes comparing the data collected with data from the baseline configuration to determine one or more differences, at block 378. The method includes initiating at least one action selected from the group including issuing an alert, flagging the differences in a database, generating a report listing the differences, identifying a solution to resolve the differences, and executing instructions to resolve the differences, at block 379.

Some method embodiments can include purging the data collected based upon whether the data collected was received by the first number of computing devices prior to a purge date. purging of such material can be beneficial, for example, because there will be less material to be used for comparison and/or old data can be replaced by newer data that may be more relevant.

Figure 4:
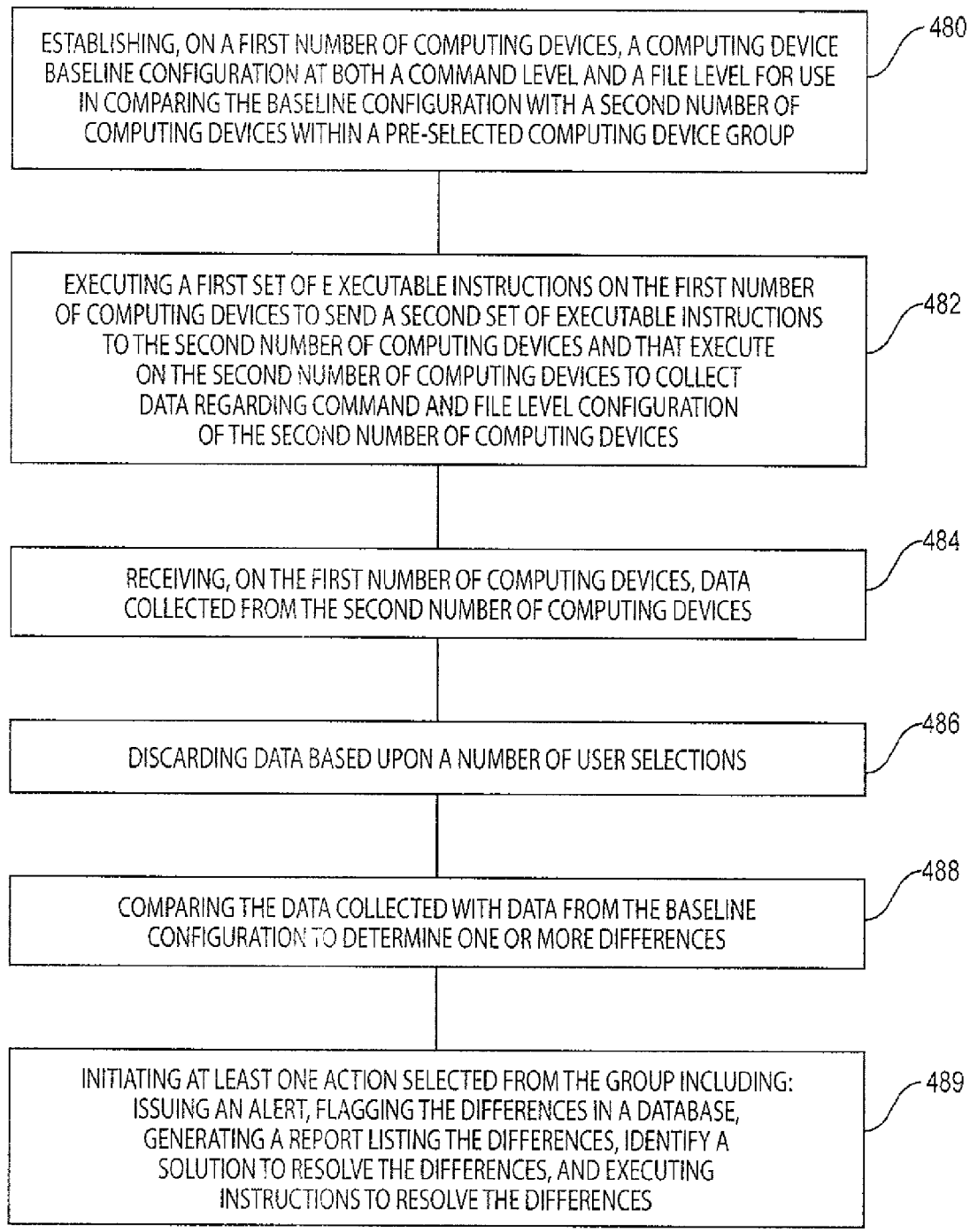
FIG. 4 illustrates another method according to one or more embodiments of the present disclosure.

FIG. 4 illustrates another method according to one or more embodiments of the present disclosure. As with the method of FIG. 3, this method can be performed by a system, such as, for example, system 100 previously described in connection with FIG. 1.

The embodiment of FIG. 4 includes establishing, on a first number of computing devices, a computing device baseline configuration at both a command level and a file level for use in comparing the baseline configuration with a second number of computing devices within a pre-selected computing device group, at block 480. In such embodiments, the pre-section can be made, for example, by a user or based upon executable instructions that execute to make the selection, for instance as discussed above.

Block 482 includes executing a first set of executable instructions on the first number of computing devices to send a second set of executable instructions to the second number of computing devices and that execute on the second number of computing devices to collect data regarding command and file level configuration of the second number of computing devices. The method also includes receiving, on the first number of computing devices, data collected from the second number of computing devices, at block 484.

The method of FIG. 4 also includes discarding data based upon a number of user selections, at block 486. Block 488 of the method embodiment of FIG. 4 includes comparing the data collected with data from the baseline configuration to determine one or more differences.

The embodiment of FIG. 4 includes initiating at least one action selected from the group including issuing an alert, flagging the differences in a database, generating a report listing the differences, identifying a solution to resolve the differences, and executing instructions to resolve the differences, at block 489. In some embodiments, identifying the solution to the resolve the differences includes searching a database for the solution. In various embodiments, identifying a solution to the resolve the differences includes receiving the solution from input by a user via a user interface provided on one of the number of first computing devices.

In some embodiments, the method includes storing a historical report including configuration information for a particular computing device therein. In various embodiments, the method includes storing a historical report including configuration information for the second number of computing devices therein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for grouped computing device configuration management, comprising:
    a first number of computing devices having processors and memory thereon for the storage of executable instructions and data, wherein the instructions are executed to:
        establish a computing device baseline configuration at both a command level and a file level for use in comparing the baseline configuration with a second number of computing devices;
        execute a first set of executable instructions on the first number of computing devices to send a second set of executable instructions to the second number of computing devices and that execute on the second number of computing devices to collect current and historical data regarding command and file level configuration of the second number of computing devices;
        receive, on the first number of computing devices, the current and historical data collected from the second number of computing devices;
        purge the current and the historical data collected based upon whether the data collected was received by the first number of computing devices prior to a purge date;
        compare the nonpurged current data collected with data from the baseline configuration to determine one or more differences;
        compare the nonpurged current data with the nonpurged historical data to determine one or more differences; and
        initiate at least one action selected from the group including:
            issuing an alert, flagging the differences in a database, generating a report listing the differences, identifying a solution to resolve the differences, and executing instructions to resolve the differences.

2. The system of claim 1, wherein the second number of computing devices is one of multiple sub-groupings of computing devices of a computing device system.

3. The system of claim 2, wherein the multiple sub-groupings of computing devices of a computing device system are grouped according to a function of the computing devices and wherein the data collected is related to the function.

4. The system of claim 2, wherein the multiple sub-groupings of computing devices of a computing device system are grouped according to the operating system of the computing devices.

5. The system of claim 2, wherein the system includes instructions that execute to provide a user interface to allow a user to define the multiple sub-groupings.

6. The system of claim 5, wherein the system includes instructions that execute to provide a user interface to allow a user to select data to be collected on the second number of computing devices.

7. The system of claim 1, wherein the system includes instructions executed to apply one or more filters to the data collected wherein the one or more filters ignore one or more differences between the data collected and the data of the baseline configuration.

8. A method of grouped computing device configuration management, comprising:

establishing, on a first number of computing devices, a computing device baseline configuration at both a command level and a file level for use in comparing the baseline configuration with a second number of computing devices within a pre-selected computing device group;

executing a first set of executable instructions on the first number of computing devices to send a second set of executable instructions to the second number of computing devices and that execute on the second number of computing devices to collect current and historical data regarding command and file level configuration of the second number of computing devices;

receiving, on the first number of computing devices, the current and the historical data collected from the second number of computing devices;

purging the current and the historical data collected based upon whether the current and the historical data collected was received by the first number of computing devices prior to a purge date;

applying one or more filters to the nonpurged data collected wherein the one or more filters ignore one or more differences between the nonpurged data collected and the data of the baseline configuration to generate a filtered set of difference data;

comparing the nonpurged current data collected with data from the baseline configuration to determine one or more differences;

comparing the nonpurged current data with the nonpurged historical data to determine one or more differences; and initiating at least one action selected from the group including:

issuing an alert, flagging the differences in a database, generating a report listing the differences, identifying a solution to resolve the differences, and executing instructions to resolve the differences.

9. The method of claim 8, wherein the method includes executing instructions to provide a user interface to allow a user to define one or more filter criteria that will be used by or to select the executable instructions to apply the one or more filters.

10. The method of claim 8, wherein applying one or more filters to the data collected includes selecting one or more files from the data collected to be discarded prior to comparing the data collected with data from the baseline configuration to determine one or more differences.

11. The method of claim 8, wherein applying one or more filters to the data collected includes selecting one or more pieces of data collected within a file and discarding the selected pieces of data prior to comparing the data collected with data from the baseline configuration to determine one or more differences.

12. The method of claim 8, wherein the method includes selecting one computing device from the number of computing devices as a baseline configuration computing device and collecting data from the baseline configuration computing device to be used as the computing device baseline configuration data.

13. The method of claim 8, wherein comparing the current and the historical data to determine one or more differences comprises determining how the command and file level configuration of the second computing devices has changed over time.

14. The method of claim 8, wherein issuing an alert includes notifying a user via a user interface on one of the first number of computing devices that data on one of the number of second computing devices has been added, changed, or deleted.

15. A non-transitory machine readable medium having a set of machine readable instructions stored thereon for execution by a processor to cause a machine to:

establish, on a first number of computing devices, a computing device baseline configuration at both a command level and a file level for use in comparing the baseline configuration with a second number of computing devices within a pre-selected computing device group;

execute a first set of executable instructions on the first number of computing devices to send a second set of executable instructions to the second number of computing devices and that execute on the second number of computing devices to collect current and historical data regarding command and file level configuration of the second number of computing devices;

receive, on the first number of computing devices, the current and the historical data collected from the second number of computing devices;

discard data based upon a number of user selections;

purge the current and the historical data collected based upon whether the data collected was received by the first number of computing devices prior to a purge date;

compare the nonpurged current data collected with data from the baseline configuration to determine one or more differences;

compare the nonpurged current data with the nonpurged historical data to determine one or more differences; and initiate at least one action selected from the group including:

issuing an alert, flagging the differences in a database, generating a report listing the differences, identifying a solution to resolve the differences, and executing instructions to resolve the differences.

16. The medium of claim 15, wherein identifying the solution to the resolve the differences includes searching a database for the solution.

17. The medium of claim 16, wherein identifying a solution to the resolve the differences includes receiving the solution from input by a user via a user interface provided on one of the number of first computing devices.

18. The medium of claim 17, wherein the method includes storing a historical report including configuration information for a particular computing device therein.

19. The medium of claim 18, comprising determining how to return the second computing device to the historical configuration.

* * * * *